(12) United States Patent
Sun

(10) Patent No.: US 10,153,103 B1
(45) Date of Patent: Dec. 11, 2018

(54) SUPPORT BAR STRUCTURE OF SEE-THROUGH BUTTON

(71) Applicant: Jen-Wen Sun, New Taipei (TW)

(72) Inventor: Jen-Wen Sun, New Taipei (TW)

( * ) Notice: Subject to any disclaimer, the term of this patent is extended or adjusted under 35 U.S.C. 154(b) by 0 days.

(21) Appl. No.: 15/717,955

(22) Filed: Sep. 28, 2017

(51) Int. Cl.
*H01H 13/02* (2006.01)
*G06F 3/02* (2006.01)
*H01H 13/14* (2006.01)
*H01H 13/50* (2006.01)
*H01H 13/10* (2006.01)

(52) U.S. Cl.
CPC ......... *H01H 13/023* (2013.01); *G06F 3/0202* (2013.01); *H01H 13/10* (2013.01); *H01H 13/14* (2013.01); *H01H 13/50* (2013.01); *H01H 2233/07* (2013.01)

(58) Field of Classification Search
CPC ...... H01H 13/023; H01H 13/14; H01H 13/10; H01H 13/50; H01H 2233/07; G06F 3/0202
USPC ........................................................ 200/314
See application file for complete search history.

(56) References Cited

U.S. PATENT DOCUMENTS

| 2007/0235306 A1* | 10/2007 | Chiba | H01H 13/83 200/314 |
| 2010/0231423 A1* | 9/2010 | Yang | H01H 3/125 341/32 |
| 2014/0190804 A1* | 7/2014 | Zhang | H01H 13/83 200/314 |

* cited by examiner

*Primary Examiner* — Edwin A. Leon
*Assistant Examiner* — Lheiren Mae A Caroc
(74) *Attorney, Agent, or Firm* — Leong C. Lei

(57) ABSTRACT

A button includes a display element including a mounting section, a hollowed bottom board having a joint section, support bar members, a button cap body having a light-transmitting section and a contacting section, and an elastic element. The support bar members and the elastic element are arranged on the contacting section located outside the button cap body to that a user is allowed to see, by way of the light-transmitting section of the button cap body, through the hollowed bottom board to watch the display element at the bottom so as to completely observe a text/pattern section of the display element. In a pressing-down operation, ends of the support bar members are allowed to rotate while sliding horizontally so as to cause the elastic element to drive the display element. Further, individual button modularization can be achieved with the arrangement of the mounting section and the joint section.

9 Claims, 12 Drawing Sheets

SUPPORT BAR STRUCTURE OF SEE-THROUGH BUTTON

TECHNICAL FIELD OF THE INVENTION

The present invention relates generally to a support bar structure of a see-through button, in which support bars and an elastic element are arranged at a site corresponding to a sidewall of a button cap so that a display screen arranged on a bottom can be observed from a top side of the button cap by seeing therethrough and multiple buttons are installed individually and separately to feature individual button modularization.

DESCRIPTION OF THE PRIOR ART

To provide a button with a luminous feature, a luminous element is arranged under a button cap, and a surface part of the button cap of the button is made of a light-transmitting material so that light emitting from the underside of the material may transmit through the surface of the button cap to achieve an effect of luminosity of a keyboard. However, contact points inside the keyboard, including rubber pads and scissors-like supports, are arranged exactly under the button so that the light source suffers poor performance of light spreading. In applications where a displaying function is included in the button by simply replacing the luminous element with a displaying screen, an image displayed on the screen would be obstructed by the rubber pad and the scissors-like support arranged exactly under the button cap so that the image cannot be completely displayed and watched.

The fevering of the trend of customization leads to diversification of keyboard configurations, button numbers, and button arrangement. However, the fabrication of a keyboard involves several factors, including membrane circuit, housing hollowed in correspondence to contact points, and button structure, which must be fabricated in a mutually matched manner. Further, in addition to outside appearance finishing that is often carried out in advance, assembling a button also requires, in mounting to a keyboard, a connection structure of a support frame provided on the button cap to connect with a carrier. Such a connection operation applies external forces in multiple directions to the support frame and this readily cause deformation and damage of the structure, making it adverse to designs for customization.

SUMMARY OF THE INVENTION

One of the objectives of the present invention is that support bar members and an elastic element are arranged at a sidewall of a button cap body to prevent obstructing a central portion of a button so as to allow seeing through from a top side of the button cap directly to a screen on the bottom and a hollowed bottom board is provided on one side of the button cap body and is provided with joint sections that are coupled to mounting sections provided at corresponding locations on a display element to thereby reduce the manufacturing cost of a button and to realize individual button modularization.

Another one of the objective of the present invention is that support bar members are arranged to support, through leverage, a vertical movement of a button cap body above the display element so as to simplify an essential structural arrangement for supporting and coupling.

The present invention provides a structure that comprises a display element for displaying at least one text/pattern section. A plurality of mounting sections is provided on at least one side of the display element. At least one hollowed bottom that has a hollowed portion to completely expose the text/pattern section is arranged above the display element. The hollowed bottom board is provided at least one joint section at one side thereof for coupling with the mounting sections. The hollowed bottom board is provided, on an outer side thereof, with a plurality of support bar members. Position-constraining slide channels are formed at locations corresponding to ends of the support bar members to allow the support bar members to slide horizontally for synchronous rotation at the same time. At least one button cap body is arranged at the side of the support bar members that is opposite to the hollowed bottom board. The button cap body comprises a light-transmitting section located exactly above the hollowed portion of the hollowed bottom board for seeing therethrough to the display element and at least one contacting section formed on outside of the light-transmitting section. At least one elastic element is provided on the hollowed bottom board for selectively contacting the contacting section to drive the display element. In this invention, arranged at a location exactly above the display element are only the hollowed portion of the hollowed bottom board and the light-transmitting section of the button cap body so that a user is allowed to see therethrough to the display element at the bottommost position. The support bar members and the elastic element that are necessary for the structure are respectively arranged at the outer side of the hollowed bottom board and on the contacting section at one side of the button cap body to avoid a viewable range of the display element. The operation of the support bar members is conducted, in collaboration with the position-constraining slide channels, to allow the ends of the support bar members to slide in a horizontal direction for supporting a reciprocal vertical movement of the button cap body to contact the elastic element to trigger the display element to display contents associated with the triggering. Further, since the joint sections of the hollowed bottom board are connectable to the mounting sections provided at one side of the display element, assembling an individual button is simplified and the manufacturing cost and maintenance cost can be reduced through individual button modularization.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
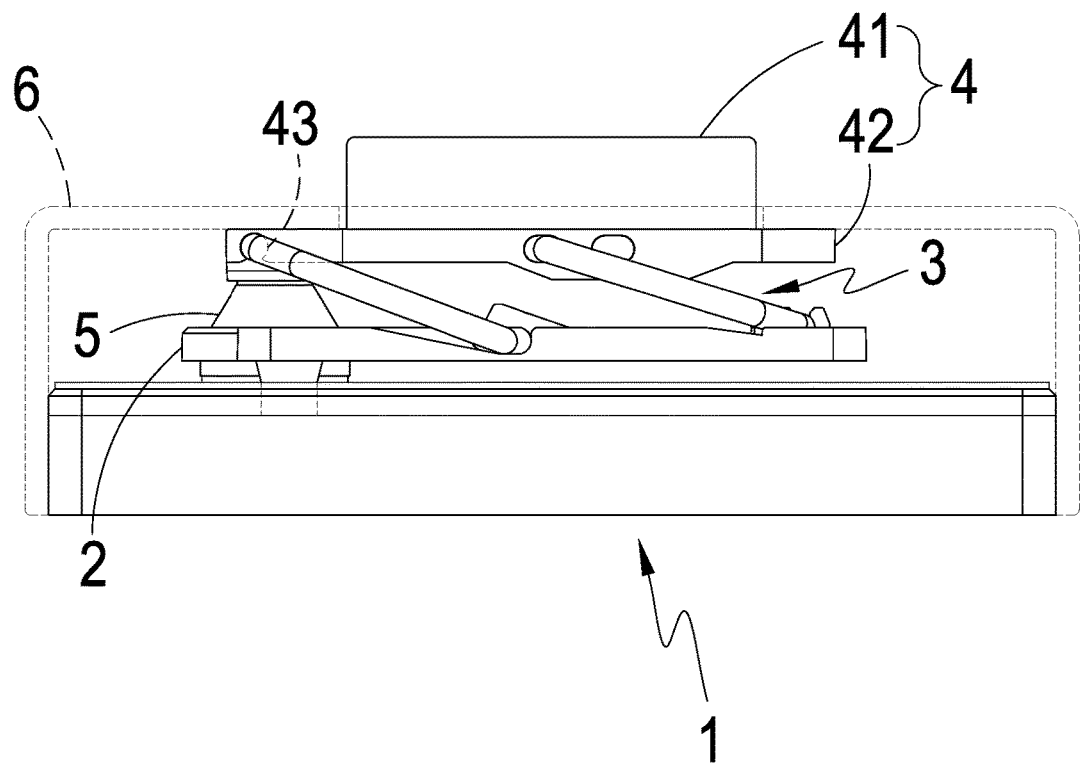
FIG. 1 is a front view of the present invention.
Figure 2:
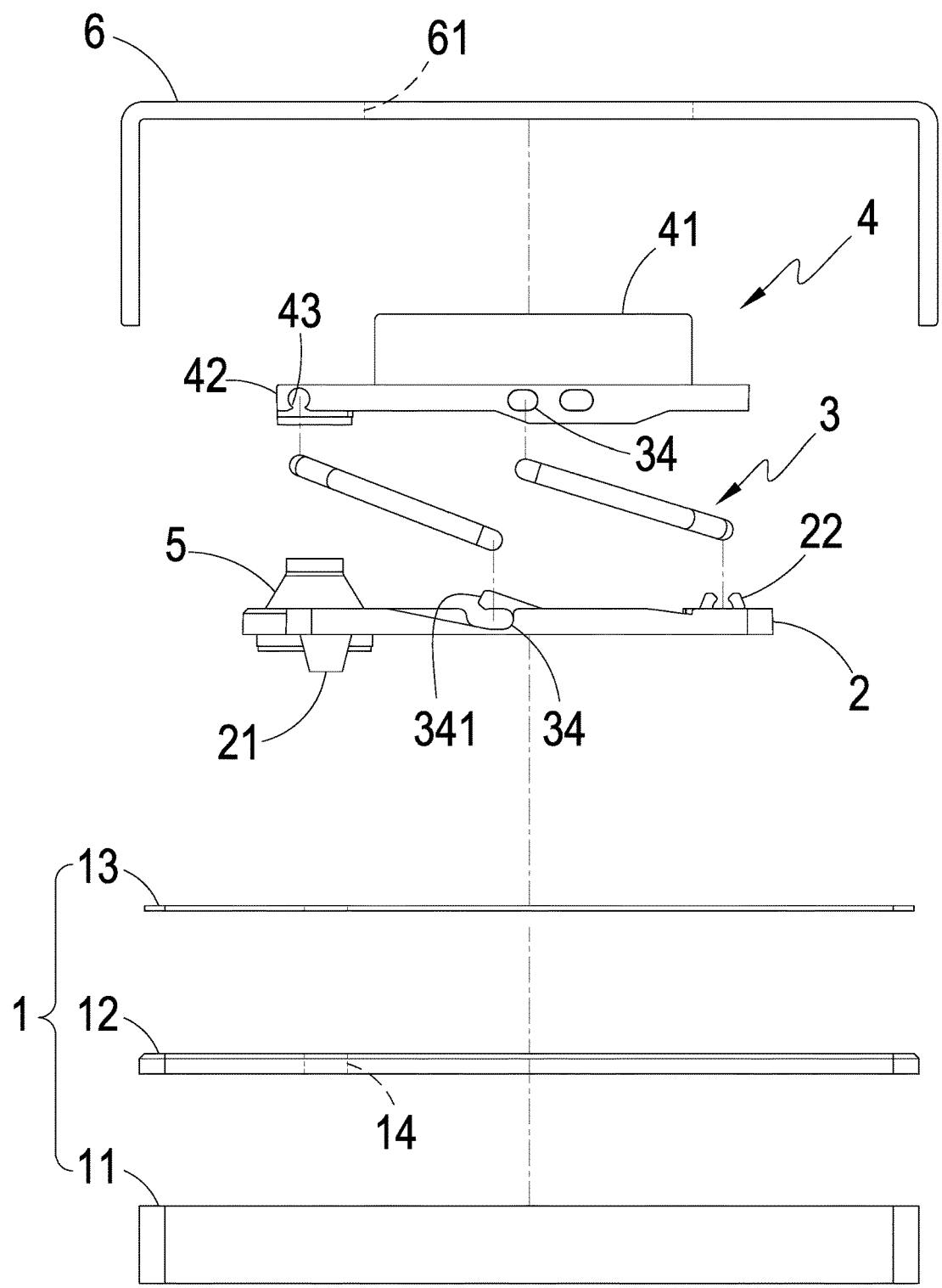
FIG. 2 is an exploded view of the present invention.
Figure 3:
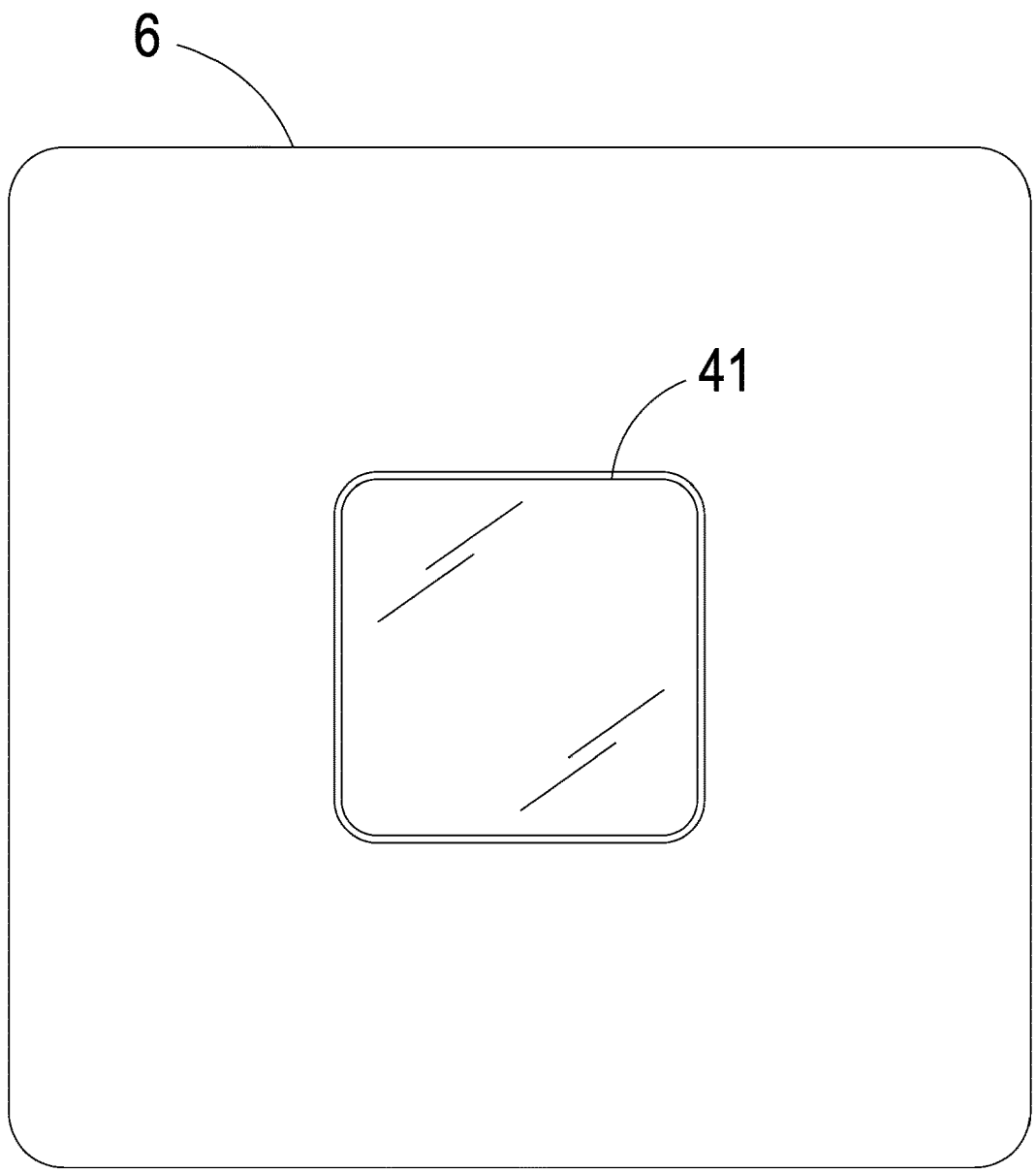
FIG. 3 is a top plan view of the present invention.
Figure 4:
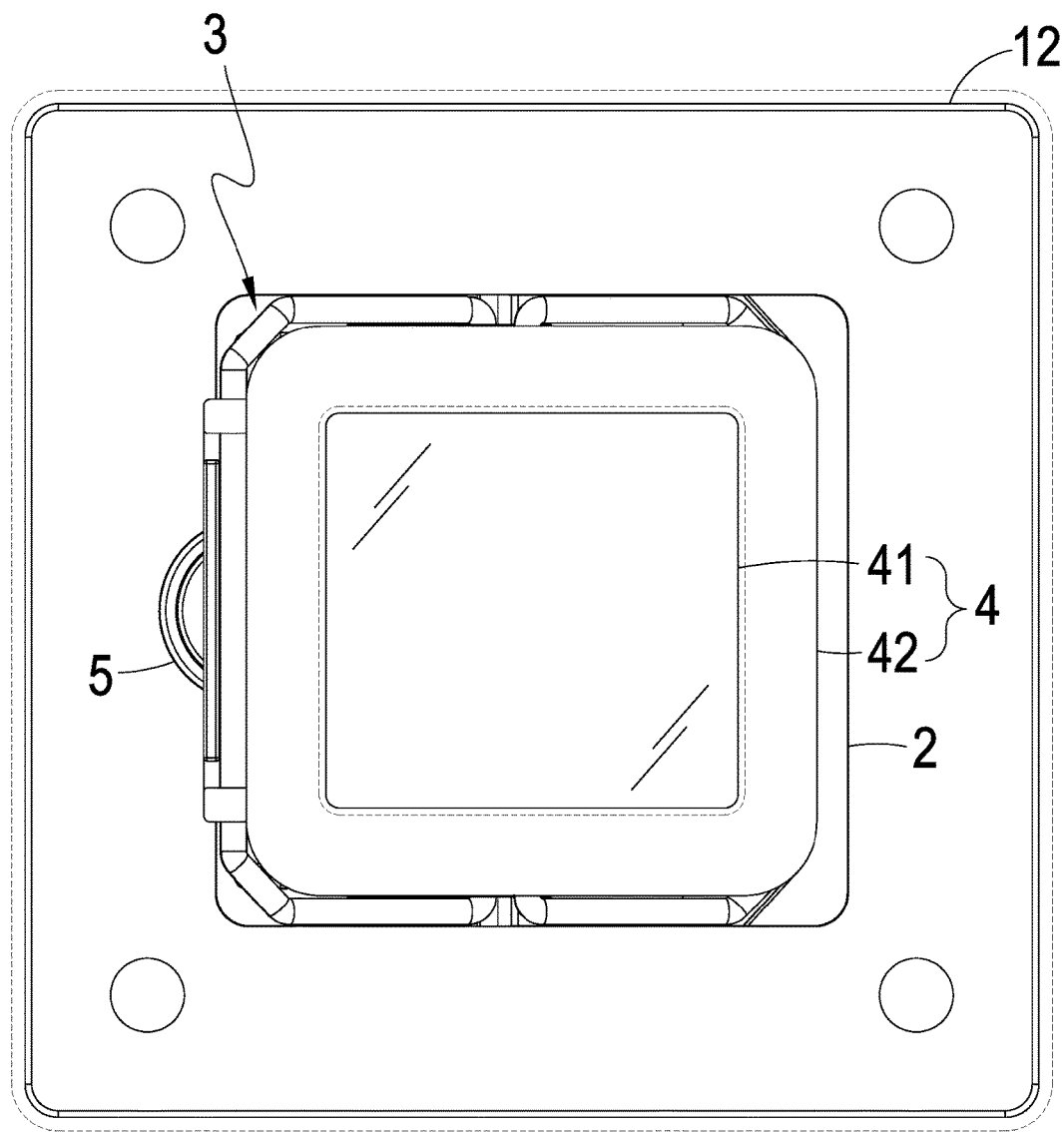
FIG. 4 is a top plan view of the present invention with certain parts removed to show inside details.
Figure 5:
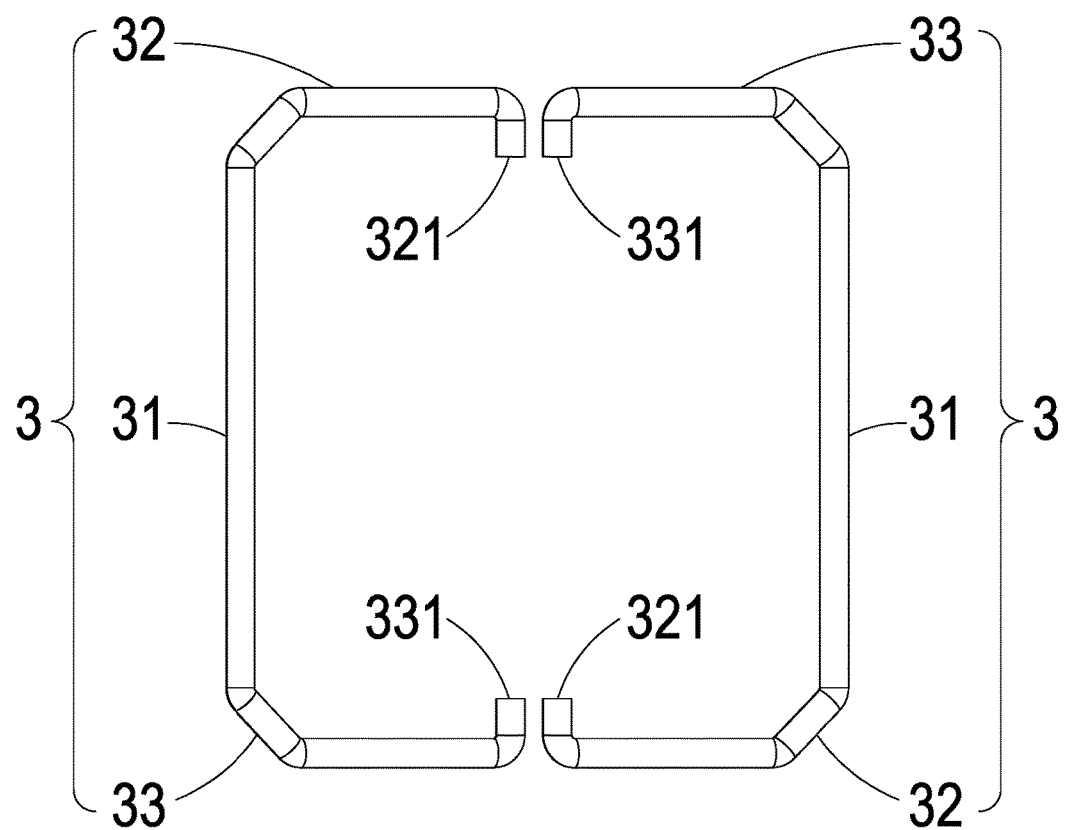
FIG. 5 is a top plan view of support bar members of the present invention.
Figure 6:
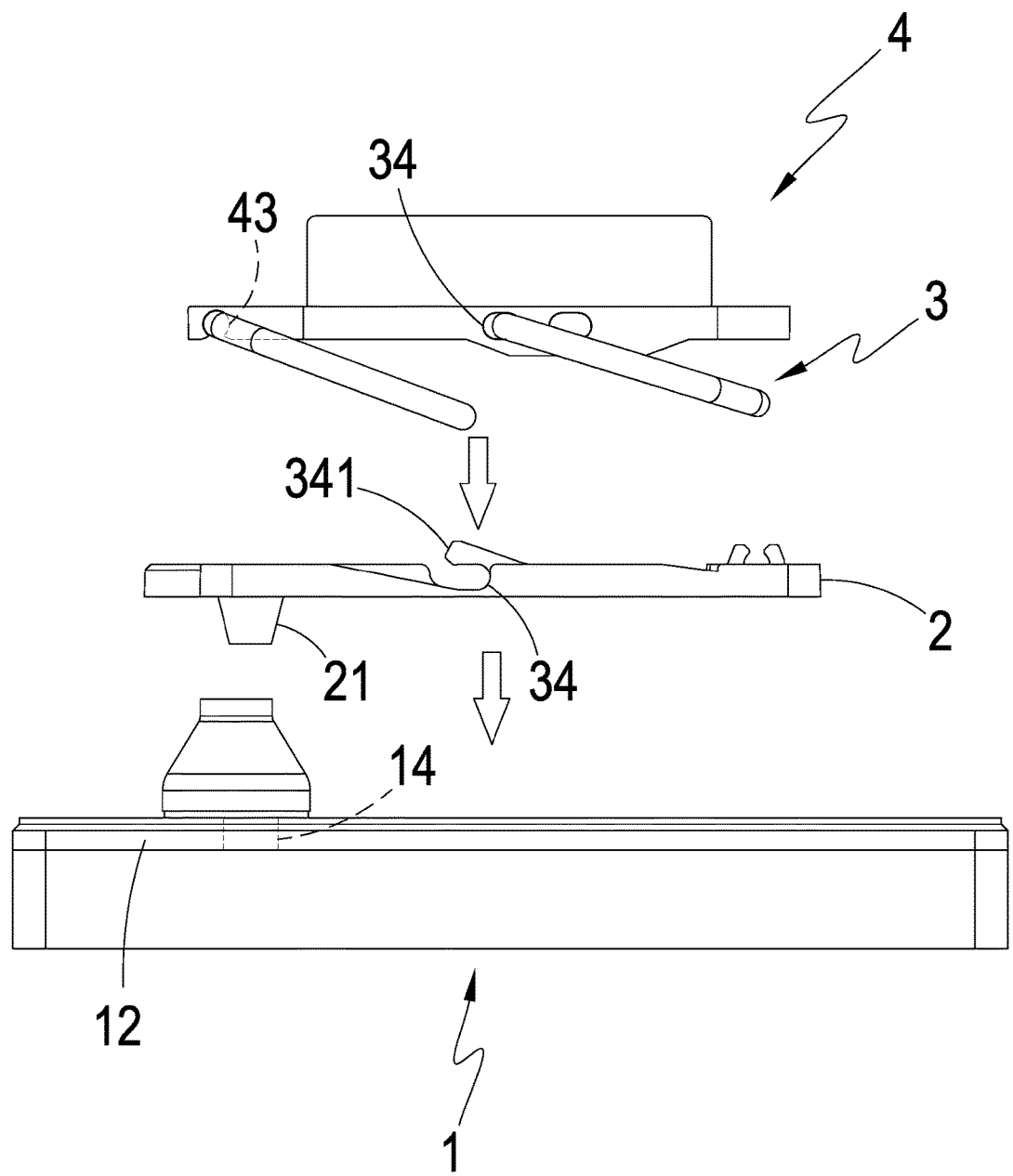
FIG. 6 is a schematic view illustrating assembly of the present invention.
Figure 7:
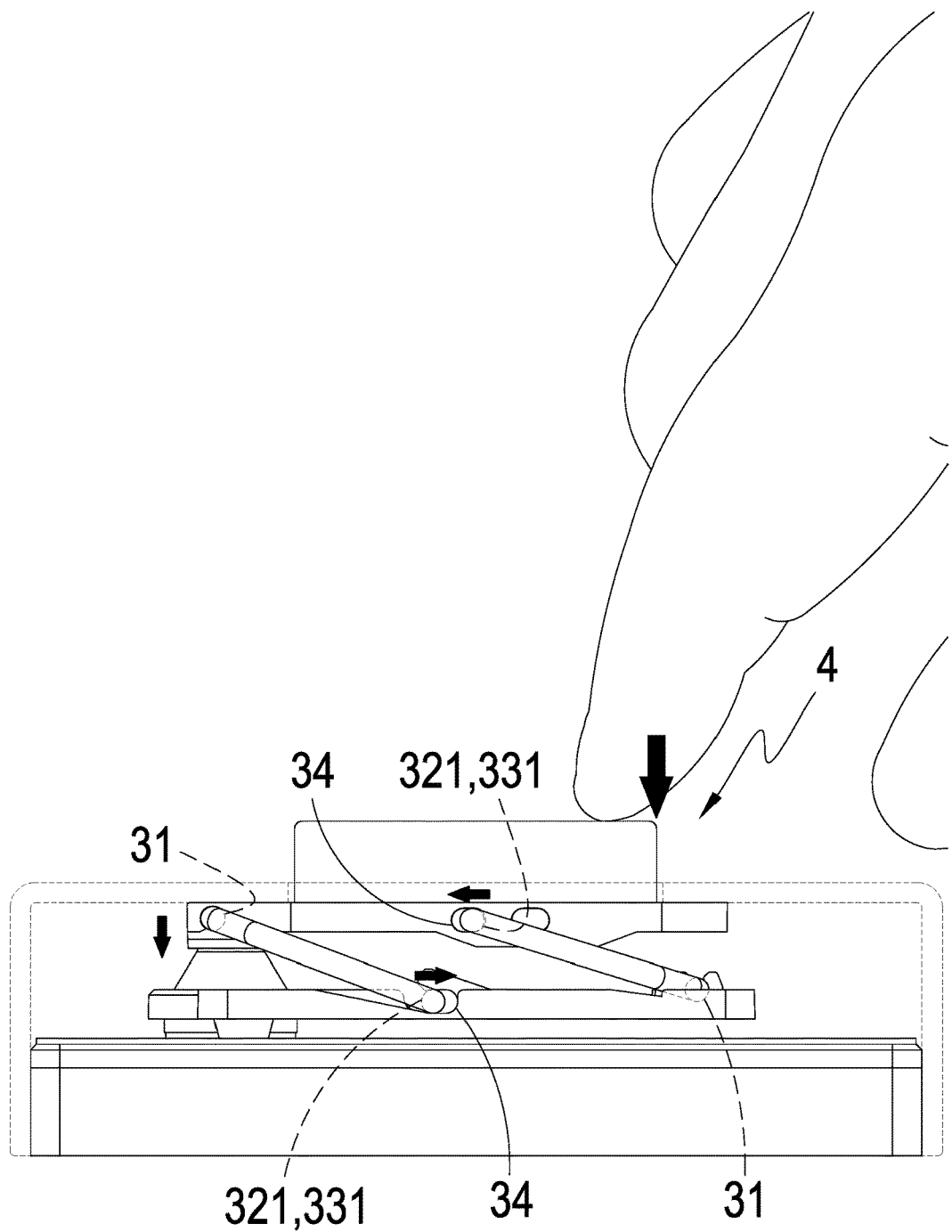
FIG. 7 is a schematic view illustrating operation of the present invention.
Figure 8:
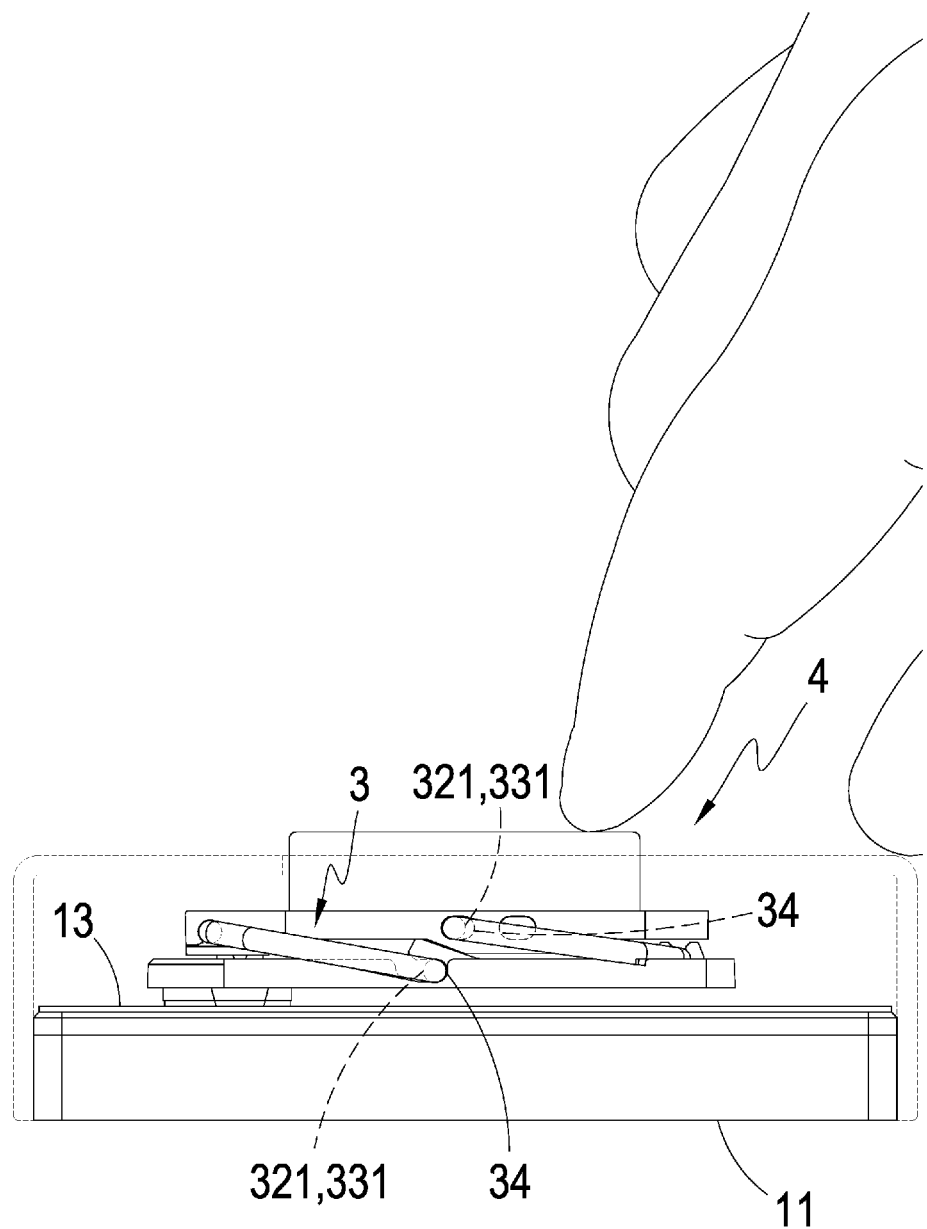
FIG. 8 is a schematic view illustrating operation of the present invention.
Figure 9:
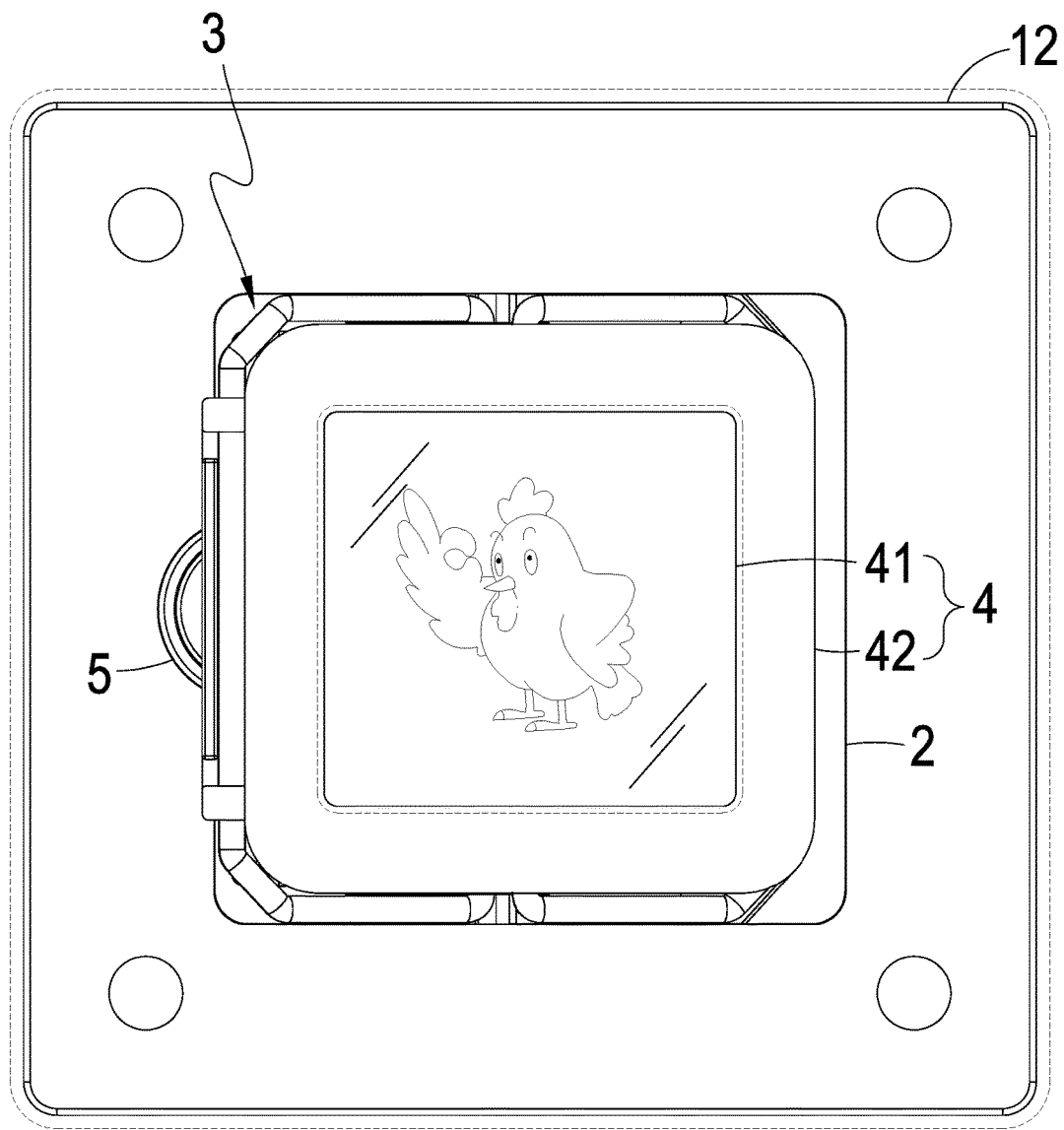
FIG. 9 is a schematic view illustrating a condition of use of the present invention.

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

As shown in FIGS. 1-5, the present invention comprises:

a display element 1 that displays at least one text/pattern section, wherein the display element 1 comprises a displaying screen 11, a button disposition bottom board 12 fixedly mounted on the displaying screen 11, and a membrane circuit 13 arranged on one side of the button disposition bottom board 12 that is opposite to the displaying screen 11 and electrically connected to the displaying screen 11 so that engagement of a hereinafter-described elastic element 5 therewith drives the displaying screen 11;

a plurality of mounting sections 14 formed in at least one side of the display element 1;

at least one hollowed bottom board 2 arranged above the display element 1 and having a hollowed portion that completely exposes the text/pattern section;

a plurality of joint sections 21 formed on one side of the hollowed bottom board 2 to correspondingly engage with and couple to the mounting sections 14;

a plurality of support bar members 3 rotatably mounted on an outer side of the hollowed bottom board 2, wherein each of the support bar members 3 comprises a connection rod section 31 that is rotatably mounted to one side of a hereinafter-described contacting section 42, a first support section 32 that is formed, in a curved manner, on one end of the connection rod section 31, and a second support section 33 formed, in a curved manner, on an opposite end of the connection rod section 31;

a first axle section 321 formed, in a bent form, on an end the first support section 32;

a second axle section 331 formed, in a bent form, on an end the second support section 33;

a plurality of position-constraining slide channels 34 formed at ends of the support bar members 3 to allow the support bar members 3 to slide horizontally for synchronous rotation, wherein each of the position-constraining sliding channels 34 is provide, on a top side thereof, with an elastic clamping section 341 to selectively constrain the positions of the first axle section 321 and the second axle section 331 therein;

at least one button cap body 4 rotatably mounted to one side of the support bar members 3 that is opposite to the hollowed bottom board 2, wherein the button cap body 4 comprises a light-transmitting section 41 located exactly above the hollowed portion of the hollowed bottom board 2 for observation of the display element 1 by seeing therethrough and at least one contacting section 42 formed on an outer side of the light-transmitting section 41;

at least one first position-limiting section 43 formed on a sidewall of the button cap body 4 to receive and retain the connection rod section 31 of one of the support bar members 3 therein;

at least one second position-limiting section 22 formed on one side of the hollowed bottom board 2 to receive and retain the connection rod section 31 of the other one of the support bar members 3 therein;

at least one elastic element 5 mounted on the hollowed bottom board 2 for selectively contacting with the contacting section 42 to contact the membrane circuit 13 for driving the displaying screen 11; and at least one cover plate element 6 arranged above the display element 1, wherein the cover plate element 6 comprises at least one opening section 61 to allow the light-transmitting section 41 movably project therethrough.

As shown in FIGS. 1-9, in respect of outside appearance, the entirety of the outside appearance is similar to a regular keyboard, except the light-transmitting section 41 of the button cap body 4 is arranged to movably project out of the opening section 61 of the cover plate element 6, wherein the button cap body 4 is formed of the light-transmitting section 41 that is located at a central portion thereof and the contacting section 42 that is arranged at a peripheral side thereof, and the support bar members 3 and the elastic element 5 that support a reciprocal vertical movement of the button cap body 4 are arranged as to completely avoid of being exactly under the light-transmitting section 41 to thereby allow a user to see through the light-transmitting section 41 to watch the display element 1 located at the bottommost location to completely observe the text/pattern section 111 of the display element 1, wherein the elastic element 5 is arranged on the hollowed bottom board 2 and two ends of the support bar members 3 are respectively arranged in the first and second position-limiting sections 43, 22 and the position-constraining slide channels 34. As such, the button can exhibit the contents of the displaying screen 11 through the light-transmitting section 41, and due to the displaying screen 11 being arranged at a bottommost position of the button structure, damages of the displaying screen 11 resulting from reciprocal movement of being pressed down or improper operation of the user.

To achieve the purpose of lowering down cost of customization and individual button modularization, the button disposition bottom board 12 of the display element 1 is provided with a plurality of mounting sections 14 and the hollowed bottom board 2 is provided with a plurality of joint sections 21 respectively coupled to the mounting sections 14. The joint sections 21 are made in the form of downward converging cones, while the mounting sections 14 are in the form of openings so that to couple the two, a minor force applied is sufficient to fit and fix the joint sections 21 to the mounting sections 14. Thus, it only needs to make the button disposition bottom board 12 in a customized form to suit clients' needs, and then, individual ones of the buttons can be mounted and installed one by one by means of the hollowed bottom board 2.

To simplify the support structure of the button cap body 4, the prior art scissors-like support is changed to two support bar members 3. The two support bar members 3 are of the same configuration of a U-shape formed of the connection rod section 31, the first support section 32, and the second support section 33, wherein the connection rod section 31 of one of the support bar members 3 is rotatably mounted to the first position-limiting section 43 at one sidewall of the button cap body 4 and the first support section 32 and the second support section 33 of the support bar members 3 are rotatably mounted in the position-constraining slide channels 34 of the hollowed bottom board 2 through the first axle section 321 and the second axle section 331, while the connection rod section 31 of the other one of the support bar members 3 is rotatably mounted to the second position-limiting section 22 at one side of the hollowed bottom board 2 and the first support section 32 and the second support section 33 of the support bar member 3 are rotatably mounted to the position-constraining slide channels 34 of the button cap body 4 through the first axle section 321 and the second axle section so that the connection rod sections 31, the first support sections 32, and the second support sections 33 of the two support bar members 3 are located on and circumferentially surround an outer circumferential flange of the hollowed portion of the hollowed bottom board 2. Further, due to the arrangement of the elastic clamping section 341, a minor downward-pressing force applied would be sufficient to smoothly set and assemble the first axle section 321 and the second axle section 331 into the position-constraining slide channels 34. To allow the two support bar members 3 to support the reciprocal vertical movement of the button cap body 4, the first axle sections 321 and the second axle sections 331 are operable as horizontal displacing in the position-constraining slide channels 34 so that rotation centers of the support bar members 3 are in non-fixed condition.

Pressing down the button cap body 4 applies a downward force that is transmitted to the first axle section 321 and the second axle section 331 of one of the support bar members 3 to cause the support bar member 3 to rotate, with the connection rod section 31 thereof as a rotation center, in a downward direction. Meanwhile, the downward force is also transmitted to the connection rod section 31 of another one of the support bar members 3 to cause the support bar member 3 to rotate, with the first axle section 321 and the second axle section 331 thereof as a rotation center, in a downward direction; however, since the first axle section 321 and the second axle section 331 are slidable in the position-constraining slide channel 34, if the downward rotation of the support bar member 3 is taken counterclockwise, then the first axle section 321 and the second axle section 331 arranged on the hollowed bottom board 2 would slide rightward, while the first axle section 321 and the second axle section 331 arranged on the button cap body 4 slide leftward so as to correct a leftward shift of the button cap body 4 caused by the counterclockwise rotation. As such, the operation of pressing down by the user may drive the button cap body 4 to smoothly descend to subsequently contact the elastic element 5 to trigger, through the membrane circuit 13, the displaying screen 11 to display a corresponding content, so that the user may see through the light-transmitting section 41 to the display element 1 at the bottommost position. In addition, since the two support bar members 3 are of an identical structure, the manufacturing cost and difficulty of assembly can be reduced.

Figure 10:
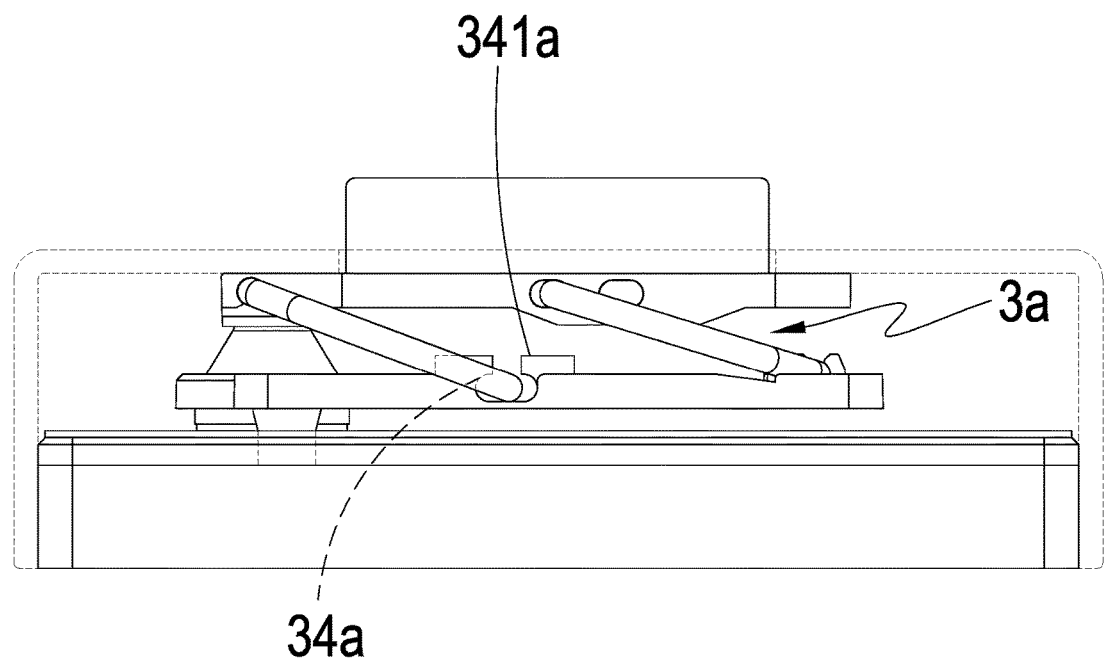
FIG. 10 is a schematic view illustrating another embodiment of the present invention.
Figure 11:
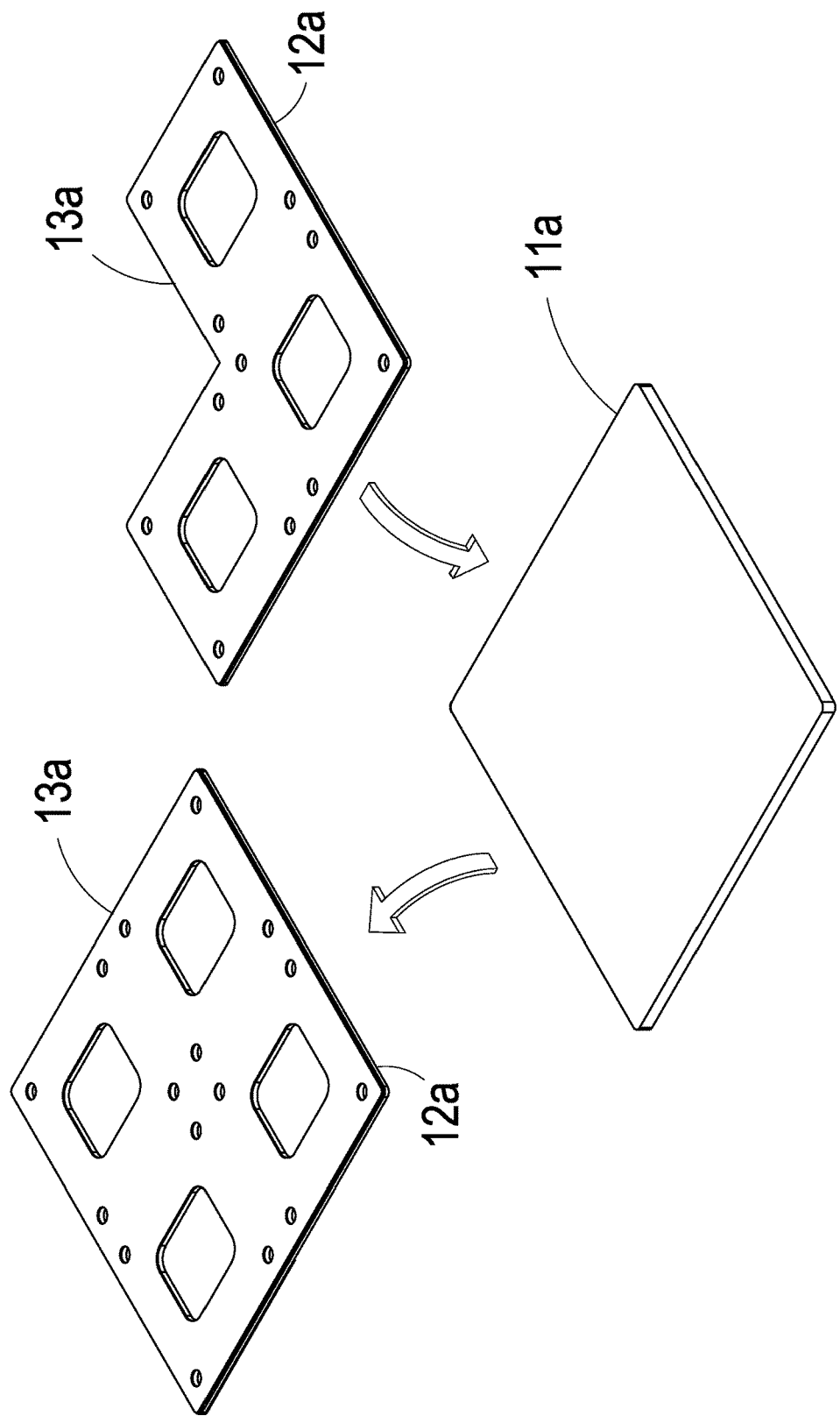
FIG. 11 is a schematic view illustrating assembly of another embodiment of the present invention.
Figure 12:
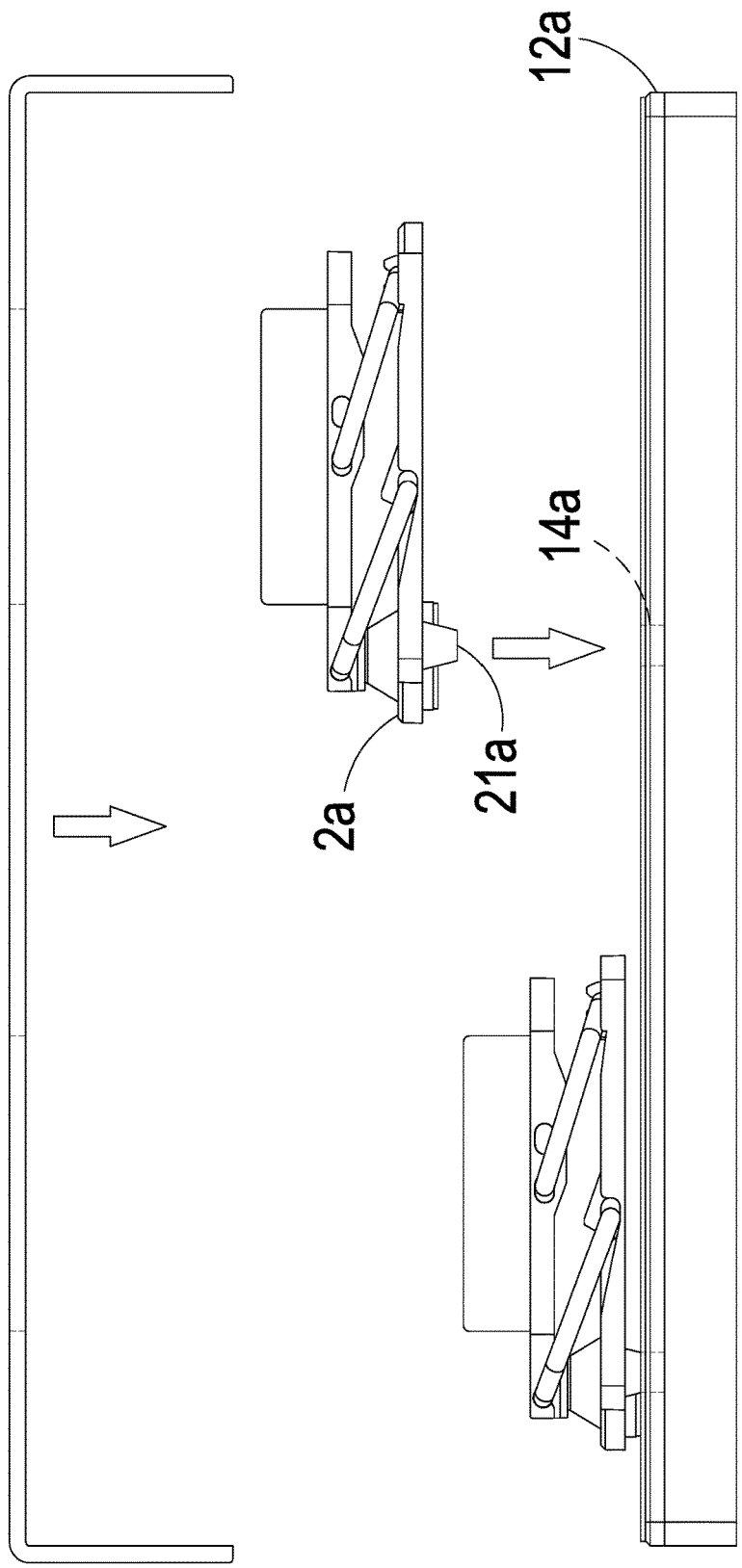
FIG. 12 is a schematic view illustrating assembly of another embodiment of the present invention.

As shown in FIGS. 10-12, in another embodiment, openings of the position-constraining slide channels 34*a* that were facing sideways in the previous embodiment are now set to face upward so that, when used in combination with the elastic clamping section 341*a*, the installation and assembly can be made simple and easy and this also helps prevent the support bar members 3*a* from detaching from the position-constraining slide channels 34*a* during the operation thereof so as to improve operation stability and similarly achieve the effect of individual piece modularization. Further, with the same displaying screen 11*a* being used, different button disposition bottom board 12*a* and membrane circuit 13*a* can be used in combination therewith to provide keyboard arrangements of different configurations. Further, fast modularized assembly may be similarly achieved through the joint sections 21*a* of the hollowed bottom board 2*a* and the mounting sections 14*a* of the display element 1*a* so as to allow for realization of customized production of keyboards by using the button disposition bottom board 12*a*.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A support bar structure of a see-through button, comprising:
    a display element, which displays at least one text/pattern section;
    a plurality of mounting sections formed on at least one side of the display element;
    at least one hollowed bottom board arranged above the display element and having a hollowed portion that completely exposes the text/pattern section;
    a plurality of joint sections formed on one side of the hollowed bottom board to correspondingly engage with and couple to the mounting sections;
    a plurality of support bar members rotatably mounted on an outer side of the hollowed bottom board;
    at least one button cap body rotatably mounted to one side of the support bar members that is opposite to the hollowed bottom board, wherein the button cap body comprises a light-transmitting section located exactly above the hollowed portion of the hollowed bottom board for observation of the display element by seeing therethrough and at least one contacting section formed on an outer side of the light-transmitting section; and
    at least one elastic element mounted on the hollowed bottom board for selectively contacting with the contacting section to drive the display element;
    wherein the display element comprises a displaying screen, a button disposition bottom board fixedly mounted on the displaying screen and comprising the mounting sections, and a membrane circuit arranged on one side of the button disposition bottom board that is opposite to the displaying screen and electrically connected to the displaying screen so that engagement of the elastic element therewith drives the displaying screen.

2. The support bar structure of the see-through button according to claim 1, wherein each of the support bar members comprises a connection rod section that is rotatably mounted to one side of the contacting section, a first support section that is formed, in a curved manner, on one end of the connection rod section, and a second support section formed, in a curved manner, on an opposite end of the connection rod section.

3. The support bar structure of the see-through button according to claim 2, wherein a first axle section is formed, in a bent form, on an end of the first support section and a second axle section is formed, in a bent form, on an end the second support section.

4. The support bar structure of the see-through button according to claim 3, wherein the position-constraining slide channels are formed in the hollowed bottom board, the button cap body, or are respectively formed in the hollowed bottom board and the button cap body, to receive the first axle sections and the second axle sections to dispose therein in a movable manner.

5. The support bar structure of the see-through button according to claim 3, wherein each of the position-constraining slide channels is provided with at least one elastic clamping section to selectively constrain the first axle section and the second axle section therein.

6. The support bar structure of the see-through button according to claim 2, wherein at least one first position-limiting section is formed on a sidewall of the button cap body to receive and retain the connection rod section of one of the support bar members therein.

7. The support bar structure of the see-through button according to claim 6, wherein at least one second position-limiting section is formed on one side of the hollowed bottom board to receive and retain the connection rod section of the other one of the support bar members therein.

8. The support bar structure of the see-through button according to claim 1, wherein the position-constraining slide channels have openings that are upward-facing openings or sideways-facing opening.

9. The support bar structure of the see-through button according to claim 1, further comprising at least one cover plate element arranged above the display element, wherein the cover plate element comprises at least one opening section to allow the light-transmitting section to movably project therethrough.

* * * * *